(No Model.)
H. MYERS.
WHEEL TIRE.
No. 459,015. Patented Sept. 8, 1891.
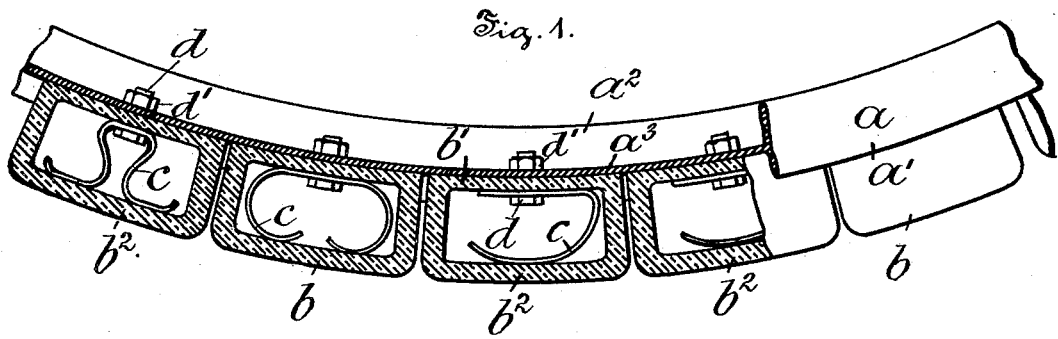
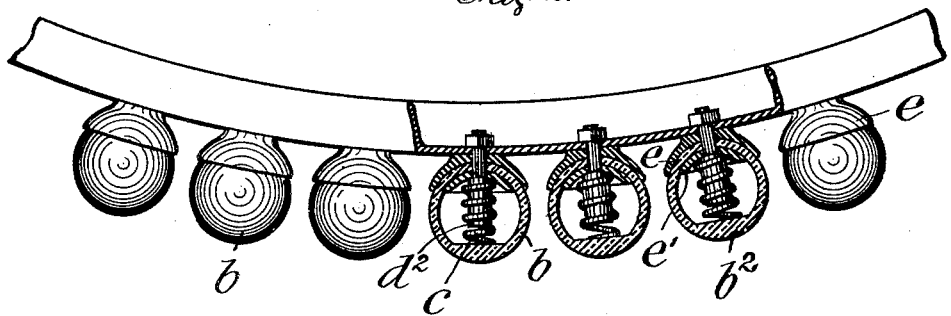
Witnesses:
Hermann Bormann
M. E. Myers
Inventor:
Henry Myers.

UNITED STATES PATENT OFFICE.

HENRY MYERS, OF PHILADELPHIA, PENNSYLVANIA.

WHEEL-TIRE.

SPECIFICATION forming part of Letters Patent No. 459,015, dated September 8, 1891.

Application filed June 29, 1891. Serial No. 397,934. (No model.)

*To all whom it may concern:*

Be it known that I, HENRY MYERS, a citizen of the United States, residing at Philadelphia, in the county of Philadelphia and State of Pennsylvania, have invented certain new and useful Improvements in Wheel-Tires, of which the following is a specification.

My improvements relate to elastic wheel-tires as described and claimed in an application filed by me on the 27th of March, 1891, and serially numbered 386,642.

The improvements consist of a flexible tire composed of hollow sections in the shape of bulbs, cylinders, or boxes attached to a metal or other tire by bolts or other suitable fastenings, and each section having an internal spring bearing, respectively, against the bed or back portion and the thread portion thereof to insure a better cushion of each section. These sections may or may not be inflated with air, gas, or liquid to add to the cushioning of the wheel as it passes over rough or uneven road-beds, and, furthermore, they may be placed at intervals, so that when passing over any roadway they will grab into the cavities of the same and prevent any slipping of the wheel.

My invention will be more fully understood taken in connection with the accompanying drawings, in which—

Figure 1 illustrates a portion of a wheel-tire having flexible hollow bulbs provided with internal springs attached thereto by means of bolts and nuts, and Fig. 2 is a similar view showing bulbs or spheres having internal springs attached to a metal tire by bolts and nuts.

Referring now to the drawings for a further description of my improvements, and particularly to Fig. 1, $a$ is a metal tire of any suitable cross-section; but preference is given to an I-section, because the flanges $a'$ serve to keep the sections $b$ in alignment, while the flanges $a^2$ may serve as a means for attaching the spokes. The sections $b$ are hollow and are provided with flat springs $c$, which may be bent into various shapes, as shown, and which springs bear against the back portion $b'$ and thread portion $b^2$.

To secure each section $b$ and spring $c$ to the web $a^3$ of the metal tire $a$, a bolt $d$ is employed, which passes through the spring $c$, which latter at the same time serves as a washer, and through the back portion $b'$ and the web $a^3$, to which all are secured by the nut $d'$. The sections $b$ may be secured at intervals to the tire $a$, as desired, to suit the different diameters of wheels.

In Fig 2 is illustrated a wheel-tire having hollow flexible spheres $b$, attached to the metal tire by means of stud-bolts having long heads or studs $d^2$, which serve as a guide for the helical springs $c$. The spheres $b$ are held in place by cups $e$ and washers $e'$, conforming to the shape of the spheres. The spring $c$ in each section bears against the washer $e'$ and thickened thread portion $b^2$ of the section or sphere $b$.

It will be understood, however, that the cups $e$ may be formed integral with the tire $a$ and that other modifications may be made without departing from the spirit of my invention.

Having thus described the nature and object of my invention, what I claim as new, and desire to secure by Letters Patent, is—

A metal tire having hollow flexible sections secured thereto to form a discontinuous flexible thread of said tire, each section provided with an internal spring bearing against the back and thread portion of each section, substantially as and for the purposes set forth.

In witness whereof I have hereunto set my signature in the presence of two subscribing witnesses.

HENRY MYERS.

Witnesses:
HERMANN BORMANN,
M. E. MYERS.